May 26, 1953
C. W. KANDLE
2,639,931
COUPLING FOR EARTH BORING UNITS
Filed Jan. 6, 1949
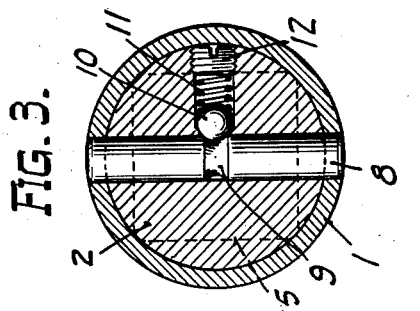
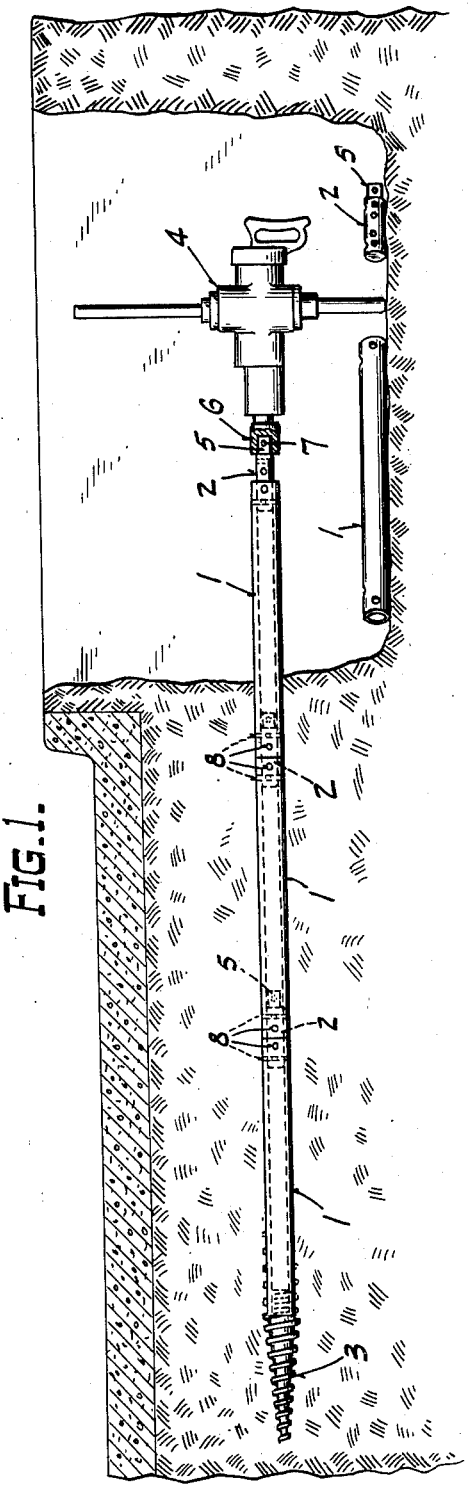
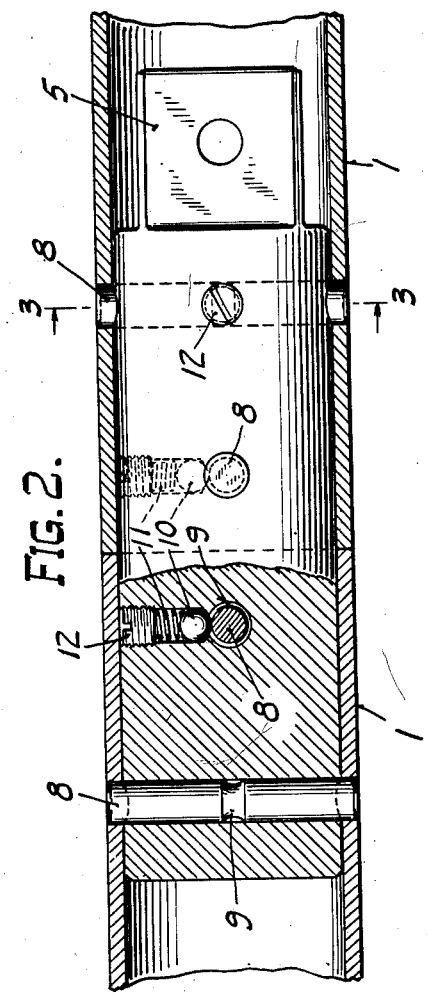
INVENTOR.
Charles W. Kandle
BY
Andrus & Sceales
ATTORNEYS.

Patented May 26, 1953

2,639,931

UNITED STATES PATENT OFFICE 2,639,931

COUPLING FOR EARTH BORING UNITS

Charles W. Kandle, Chicago, Ill.

Application January 6, 1949, Serial No. 69,581

2 Claims. (Cl. 287—127)

This invention relates to a coupling for an earth boring unit.

The principal object of the invention is to provide a coupling for a boring unit which does not interfere with the boring operation or removal of the boring unit from the drilled hole.

Another object is to provide a coupling system for an earth boring unit which is improved over previous coupling systems.

A further object is to provide a coupling for an earth boring unit which readily couples the unit together.

A further object is to provide a coupling unit with a pin which can be inserted into the coupling from either side.

These and other objects of the invention will appear hereinafter in connection with the following description of an embodiment of the invention illustrated in the accompanying drawings.

In the drawings:

Figure 1 is a side elevation of an earth boring unit coupled together shown in a horizontal boring operation with parts broken away and sectioned, and illustrating a pipe and coupling to be assembled with the unit;

Fig. 2 is an enlarged detail view illustrating the coupling of the invention; and Fig. 3 is a section taken on line 3—3 of Fig. 1.

In earth boring operations it is often desirable to first drill a small hole which serves as a guide hole in drilling a larger hole along the same course. One method of drilling a guide hole along a straight course is to employ connected lengths of pipe to the forward end of which is attached a lead screw. The pipe is rotated to rotate the screw and maintains the screw in a straight course. Thus, for example, in making a horizontal hole beneath a sidewalk or pavement the course of the hole can be fairly accurately determined.

It also may be desirable to pull a guide pipe horizontally beneath pavement or sidewalks to eliminate the necessity of disturbing the pavement or walk and provide a hole through which pipe can be inserted as for water or gas service.

In both of the operations described it may be desirable to couple together several lengths of pipe and it is the couple and coupling system employed to join a plurality of pipe lengths together for rotation to which the invention is directed.

The earth boring unit shown in the drawing comprises a plurality of lengths of pipe 1 laid end to end and within which is disposed a plurality of coupling members 2 for joining the pipe lengths together. The elongated tapered drill or screw 3 is threaded into the one end of the coupled pipe lengths and the portable electric or air motor 4 is secured to the other end of the coupled pipe 1 to rotate the unit in earth boring operations. Figure 1 illustrates the unit assembled and in horizontal position in boring a horizontal hole beneath a pavement.

Each coupling member 2 is formed of a cylindrical bar of a diameter to fit within pipe 1. The square head 5 is provided on one end of member 2 to fit within a complementary formed socket 6 of motor 4. Pin 7 extends through socket 6 and head 5 to temporarily couple the motor to each respective coupling member 2, as will be described.

A coupling member 2 extends within the ends of each pair of pipes 2 on the inside. Each member 2 is secured to one of the pipes 1 by a pair of pins 8 and to the next adjacent pipe by a second pair of pins 8.

Pins 8 are spaced apart longitudinally and the pins of each pair extend through the coupling member 2 and pipe 1 at right angles to each other. Matching holes are provided in the pipes and coupling members for insertion of pins 8 upon alignment of the holes.

Pins 8 are cylindrical and substantially of the same diameter throughout. When the pins are inserted into place to join the coupling members and pipes together the outer portions of the pins lie flush with the circumferential surface of pipes 1. In this position when the pipe is rotated the pins do not hit the sides of the hole being bored and consequently do not interfere with rotation of the pipe.

Each pin 8 has a central groove 9. Groove 9 is engaged by ball 10 confined within a hole in the coupling member 2 at right angles to the hole for pin 8 and aligned with groove 9 when pin 8 is positioned. Ball 10 is backed by spring 11 and set screw 12 which is threaded into coupling 2. Each pin 8 when forced through its respective aligned holes in pipe 1 and coupling 2 engages ball 10 and forces the latter outwardly against spring 11 until the ball is forced by the spring into engagement with groove 9 to prevent lateral displacement of the pin. The ends of pins 8 may be slightly tapered for engaging ball 10 to readily force the ball outwardly. Pin 8 is snapped out of the hole by merely pressing against one end of the pin to force ball 10 out of groove 9. The confinement of the ball in the hole permits slight movement of the ball inwardly and outwardly and yet the ball is held in coupling 2 when pin 8 is not in place. Pin 8 can be inserted through either side of pipe 1 and its respective coupling and the holes through the pipe and coupling to receive a pin 8 are of the same diameter throughout.

In assembling an earth boring unit a coupling member 2 is first secured by a pair of pins 8 within a pipe 1. Head 5 and the outer portion of the coupling member projects from one end of the pipe and lead screw 3 is secured to the other end of the pipe. Motor 4 is then coupled to head 5 by slipping socket 6 over head 5 and inserting pin 7 therethrough. Motor 4 is then started and pipe 1 and lead screw 3 rotated. When lead drive 3 has worked its way into the ground motor 4 is uncoupled from head 5 and a second length of pipe 1 is slipped in abutting position next to the first pipe 1 over the outer portion of the first coupling member 2 and is secured to coupling 2 by insertion of a pair of pins 8 at right angles to each other as described.

The forward portion of a second coupling member 2 is then secured within the second length of pipe 1 by a pair of pins 8. The motor 4 is then secured to the head 5 of the second coupling member by pin 7 in order to rotate the two pipes and coupling members and drive lead screw 3 farther into the ground. The disassembly of the motor and addition of pipe and coupling and reassembly of the motor with the unit as described is continued until the hole desired is completed.

The motor can then be detached and the pipe pulled out and uncoupled successively until completely removed. The drilled hole then may serve as a guide for a lead screw in continued drilling operations if it is desired to enlarge the hole, or a permanent pipe installation may be made in the drilled hole.

Pipe 1 keeps the screw 3 on a true course so that the hole will come out where desired. Pins 8 and the detent and groove arrangement provide for ready assembly of pipe and coupling members. Pins 8 being flush with the pipe when in position do not interfere with the pipe rotation or disturb the ground around the hole and are insertable from either side of the unit.

Various embodiments of the invention may be employed within the scope of the accompanying claims.

I claim:

1. In a coupling system for an earth boring unit having a drill secured to a plurality of lengths of pipe laid end to end and a motor to rotate the same, a coupling comprising a generally cylindrical member with the one end portion disposed in one length of pipe and the other end portion thereof disposed in another length of pipe, a head on said one end portion of said coupling member to be engaged by said motor, cylindrical pins extending transversely through each pipe and coupling to join the same together for rotation with the outer ends of the pins flush with the circumferential surface of the pipe to prevent engagement with the ground being bored, and means to secure said pins against displacement.

2. In a coupling system for an earth boring unit having a drill secured to a plurality of lengths of pipe laid end to end and a motor to rotate the same, a coupling comprising a generally cylindrical member with one end portion disposed in one length of pipe and the other end portion thereof disposed in another length of pipe, a head on said one end portion of said coupling member engaged by said motor, cylindrical pins extending transversely through each pipe and coupling to join the same together for rotation with the outer ends of the pins flush with the circumferential surface of the pipe to prevent engagement with the ground being bored, a central circumferential groove in each pin, and a spring pressed ball detent disposed in said groove when a pin is in place to prevent lateral displacement of the same relative to said pipe.

CHARLES W. KANDLE.

References Cited in the file of this patent

UNITED STATES PATENTS

| Number | Name | Date |
|---|---|---|
| 256,728 | Pulmer | Apr. 18, 1882 |
| 297,153 | Muir | Apr. 22, 1884 |
| 799,176 | Marble et al. | Sept. 12, 1905 |
| 1,108,567 | Fox | Aug. 25, 1914 |
| 1,210,187 | Marquiss | Dec. 26, 1916 |
| 1,502,528 | Reulbach | July 22, 1924 |
| 1,927,844 | Pfauser | Sept. 26, 1933 |
| 2,260,811 | Kozak | Oct. 28, 1941 |
| 2,287,725 | Conte | June 23, 1942 |
| 2,588,901 | Weikart | Mar. 11, 1952 |